US012275244B2

(12) United States Patent
Nagano

(10) Patent No.: US 12,275,244 B2
(45) Date of Patent: Apr. 15, 2025

(54) PIEZOELECTRIC DEVICE, LIQUID EJECTING HEAD, AND LIQUID EJECTING APPARATUS

(71) Applicant: SEIKO EPSON CORPORATION, Tokyo (JP)

(72) Inventor: Daisuke Nagano, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 221 days.

(21) Appl. No.: 18/181,915

(22) Filed: Mar. 10, 2023

(65) Prior Publication Data

US 2023/0286274 A1 Sep. 14, 2023

(30) Foreign Application Priority Data

Mar. 11, 2022 (JP) ................................ 2022-037849

(51) Int. Cl.
*B41J 2/14* (2006.01)

(52) U.S. Cl.
CPC .. *B41J 2/14233* (2013.01); *B41J 2002/14258* (2013.01)

(58) Field of Classification Search
CPC .......... B41J 2/14233; B41J 2002/14419; B41J 2002/14491; B41J 2202/03; H10N 30/8542
See application file for complete search history.

(56) References Cited

U.S. PATENT DOCUMENTS

2011/0273517 A1* 11/2011 Miyazawa ............ B41J 2/1646 347/68
2014/0145555 A1* 5/2014 Kurachi ............ A61B 5/02444 310/311
2021/0408361 A1* 12/2021 Hamada ............ H10N 30/2047
2022/0305772 A1* 9/2022 Nagano ................ B41J 2/0451
2023/0210011 A1* 6/2023 Hamada ................ B41J 2/1631 347/71

FOREIGN PATENT DOCUMENTS

JP 2015-166160 A 9/2015

* cited by examiner

*Primary Examiner* — John Zimmermann
(74) *Attorney, Agent, or Firm* — Harness, Dickey & Pierce, P.L.C.

(57) ABSTRACT

A piezoelectric device includes: a substrate having a plurality of recesses; a vibration plate provided on one side of the substrate; and a piezoelectric actuator including layers of first electrodes, a piezoelectric layer, and a second electrode provided in this order on the vibration plate side, and the piezoelectric actuator has a plurality of active portions including the first electrode, the second electrode, and the piezoelectric layer held between the first electrode and the second electrode, the first electrode serves as an individual electrode individually provided for each active portion, the second electrode serves as a common electrode shared by the plurality of active portions, and the second electrode includes a first end portion serving as a reference and a protruding portion protruding from an end portion of the active portion beyond the first end portion toward a coupling electrode electrically coupled to the first electrode.

8 Claims, 8 Drawing Sheets

PIEZOELECTRIC DEVICE, LIQUID EJECTING HEAD, AND LIQUID EJECTING APPARATUS

The present application is based on, and claims priority from JP Application Serial Number 2022-037849, filed Mar. 11, 2022, the disclosure of which is hereby incorporated by reference herein in its entirety.

BACKGROUND

1. Technical Field

The present disclosure relates to a piezoelectric device including a substrate, a vibration plate, and a piezoelectric actuator; a liquid ejecting head that ejects liquid through nozzles; and a liquid ejecting apparatus.

2. Related Art

Ink-jet print heads are known as a liquid ejecting head which is an electronic device. An ink-jet print head includes a substrate having a plurality of pressure chambers connected to nozzles, a vibration plate provided on the substrate, and a piezoelectric actuator including first electrodes, a piezoelectric layer, and a second electrode provided on the vibration plate. Such an ink-jet print head has been proposed in which a piezoelectric actuator has a plurality of active portions including a first electrode, a second electrode, and a piezoelectric layer held between the first electrode and the second electrode, the first electrode serves as an individual electrode individually provided for each active portion, and the second electrode serves as a common electrode shared by the plurality of active portions (for example, see JP-A-2015-166160).

However, the above ink-jet print head has a problem that repeatedly driving the active portion causes stress concentration at an end portion of the active portion, the stress concentration causes cracks in the piezoelectric layer, current leak occurs along the cracks, and the current leak is apt to cause burning and drive failures in the active portion.

Such a problem exists not only in liquid ejecting heads typified by ink-jet print heads but also in piezoelectric devices.

SUMMARY

An aspect of the present disclosure to solve the above problem is a piezoelectric device including: a substrate having a plurality of recesses; a vibration plate provided on one side of the substrate; and a piezoelectric actuator including layers of first electrodes, a piezoelectric layer, and a second electrode provided in this order on the vibration plate side, in which the piezoelectric actuator has a plurality of active portions including the first electrode, the second electrode, and the piezoelectric layer held between the first electrode and the second electrode, the first electrode serves as an individual electrode individually provided for each active portion, the second electrode serves as a common electrode shared by the plurality of active portions, and the second electrode includes a first end portion serving as a reference and a protruding portion protruding from an end portion of the active portion beyond the first end portion toward a coupling electrode electrically coupled to the first electrode.

Another aspect of the present disclosure is a liquid ejecting head including: a substrate having a plurality of pressure chambers connected to nozzles configured to eject liquid; a vibration plate provided on one side of the substrate; and a piezoelectric actuator including layers of first electrodes, a piezoelectric layer, and a second electrode provided in this order on the vibration plate side, in which the piezoelectric actuator has a plurality of active portions including the first electrode, the second electrode, and the piezoelectric layer held between the first electrode and the second electrode, the first electrode serves as an individual electrode individually provided for each active portion, the second electrode serves as a common electrode shared by the plurality of active portions, and the second electrode includes a first end portion serving as a reference and a protruding portion protruding from an end portion of the active portion beyond the first end portion toward a coupling electrode electrically coupled to the first electrode.

Still another aspect of the present disclosure is a liquid ejecting apparatus including the liquid ejecting head according to the above aspect.

DESCRIPTION OF EXEMPLARY EMBODIMENTS

Figure 1:
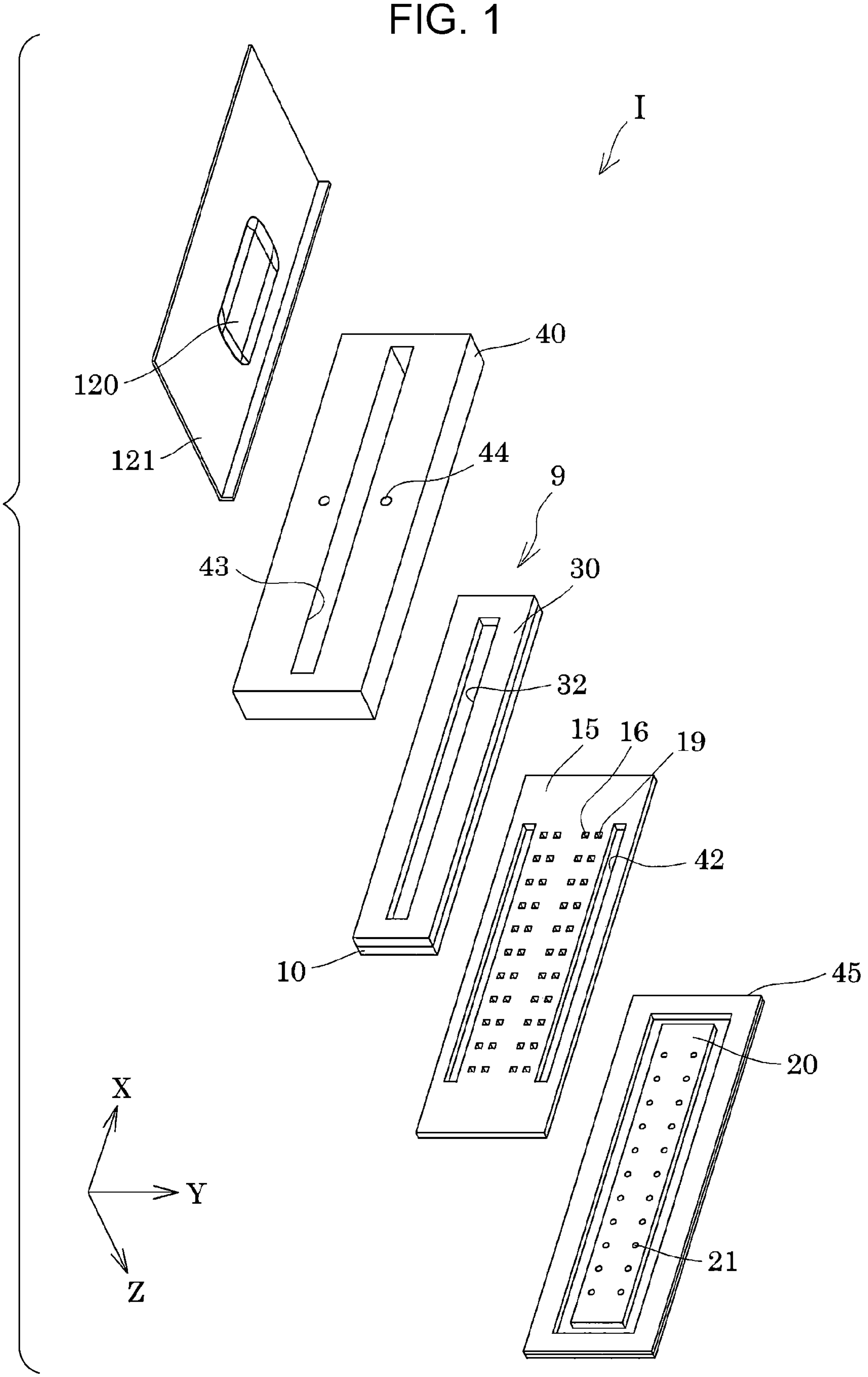
FIG. 1 is an exploded perspective view of a print head according to Embodiment 1.

Hereinafter, the present disclosure will be described in detail based on embodiments. However, the following description is only to show an aspect of the present disclosure, and hence, the embodiments can be changed as appropriate within the scope of the present disclosure. In each figure, the members having the same reference numerals indicate the same members, description of which is omitted as appropriate. In each figure, X, Y, and Z represent the three space axes orthogonal to one another. In the present specification, the directions along these axes are referred to as the X direction, the Y direction, and the Z direction. In the following description, the directions that the arrows in each figure point are referred to as the positive (+) directions, and the directions opposite to the arrows are referred to as the negative (−) directions. The three space axes of X, Y, and Z not limited to either the positive or negative direction are referred to as the X-axis, the Y-axis, and the Z-axis in the following description.

Embodiment 1

Figure 2:
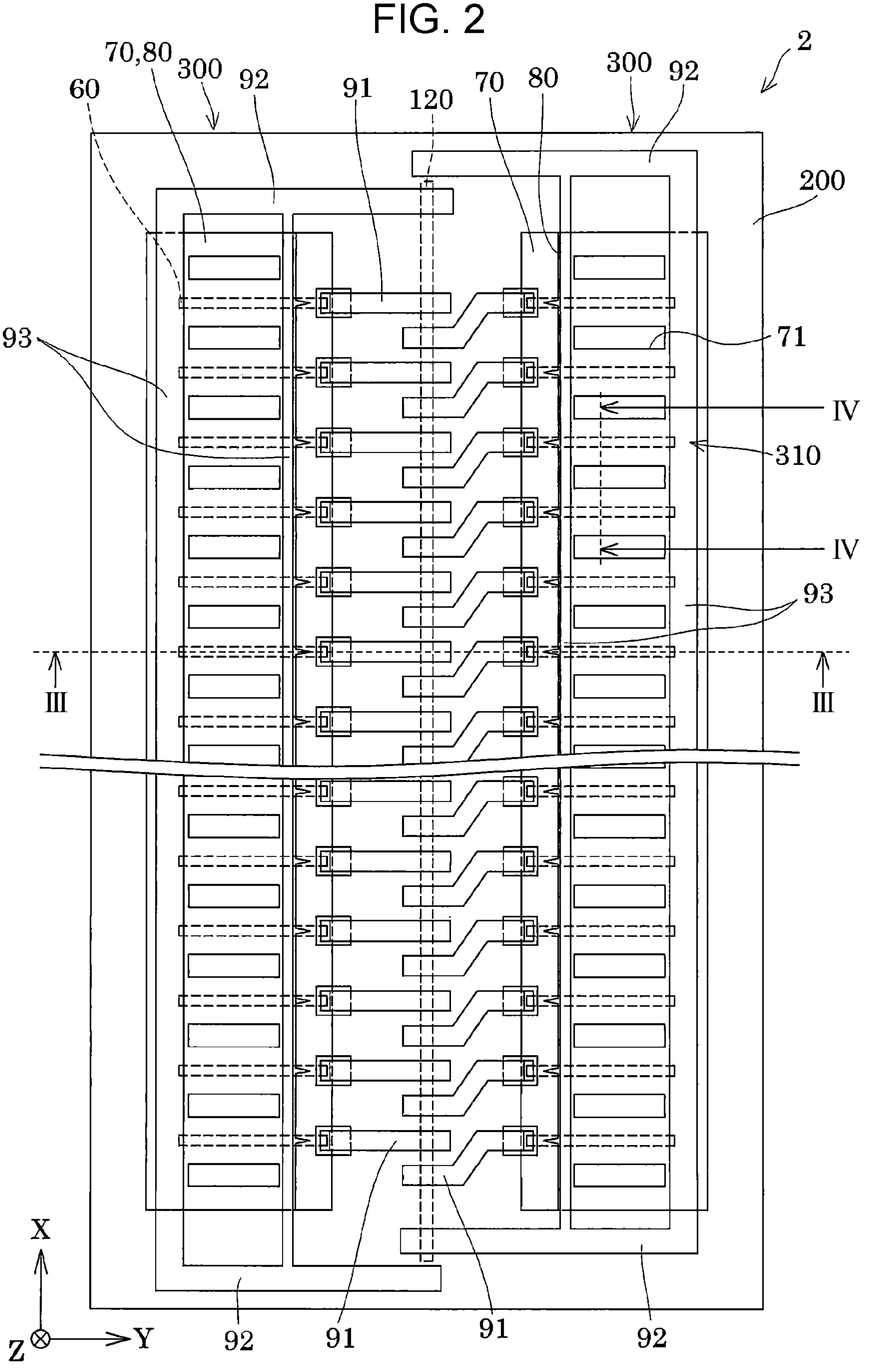
FIG. 2 is a plan view of a flow-path formed substrate of the print head according to Embodiment 1.
Figure 3:
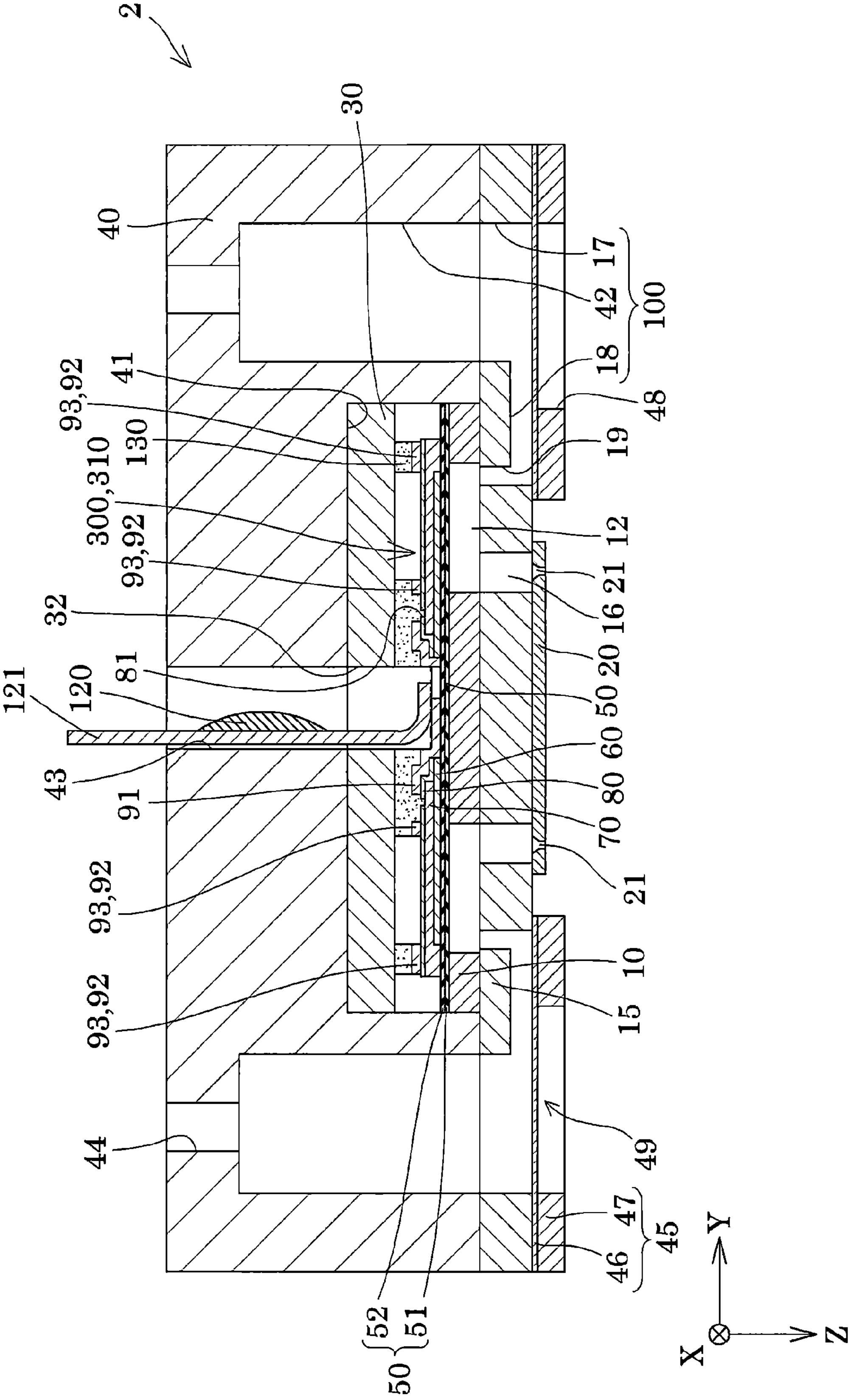
FIG. 3 is a cross-sectional view of the print head according to Embodiment 1.
Figure 4:
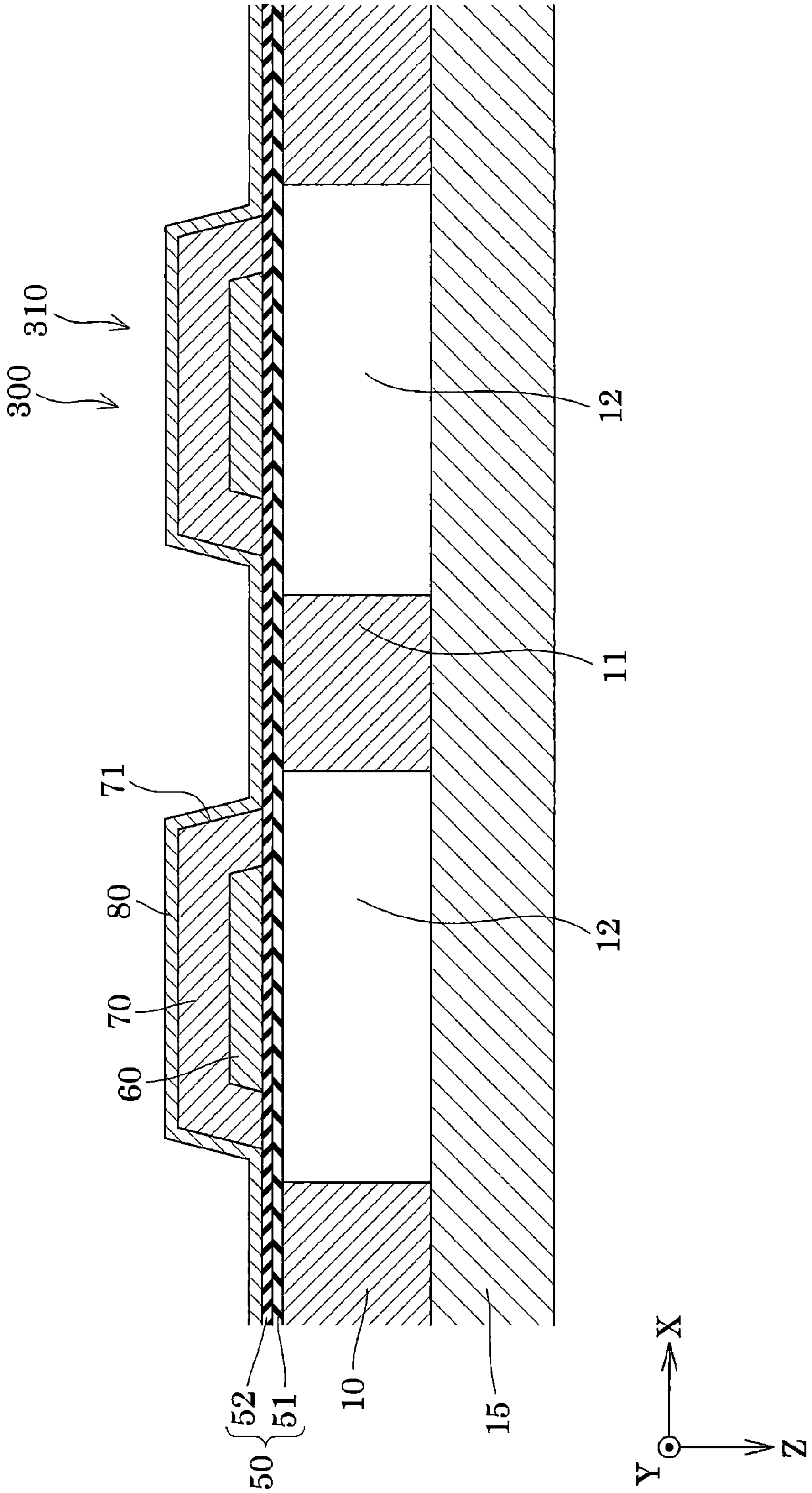
FIG. 4 is a cross-sectional view of the print head according to Embodiment 1.
Figure 5:
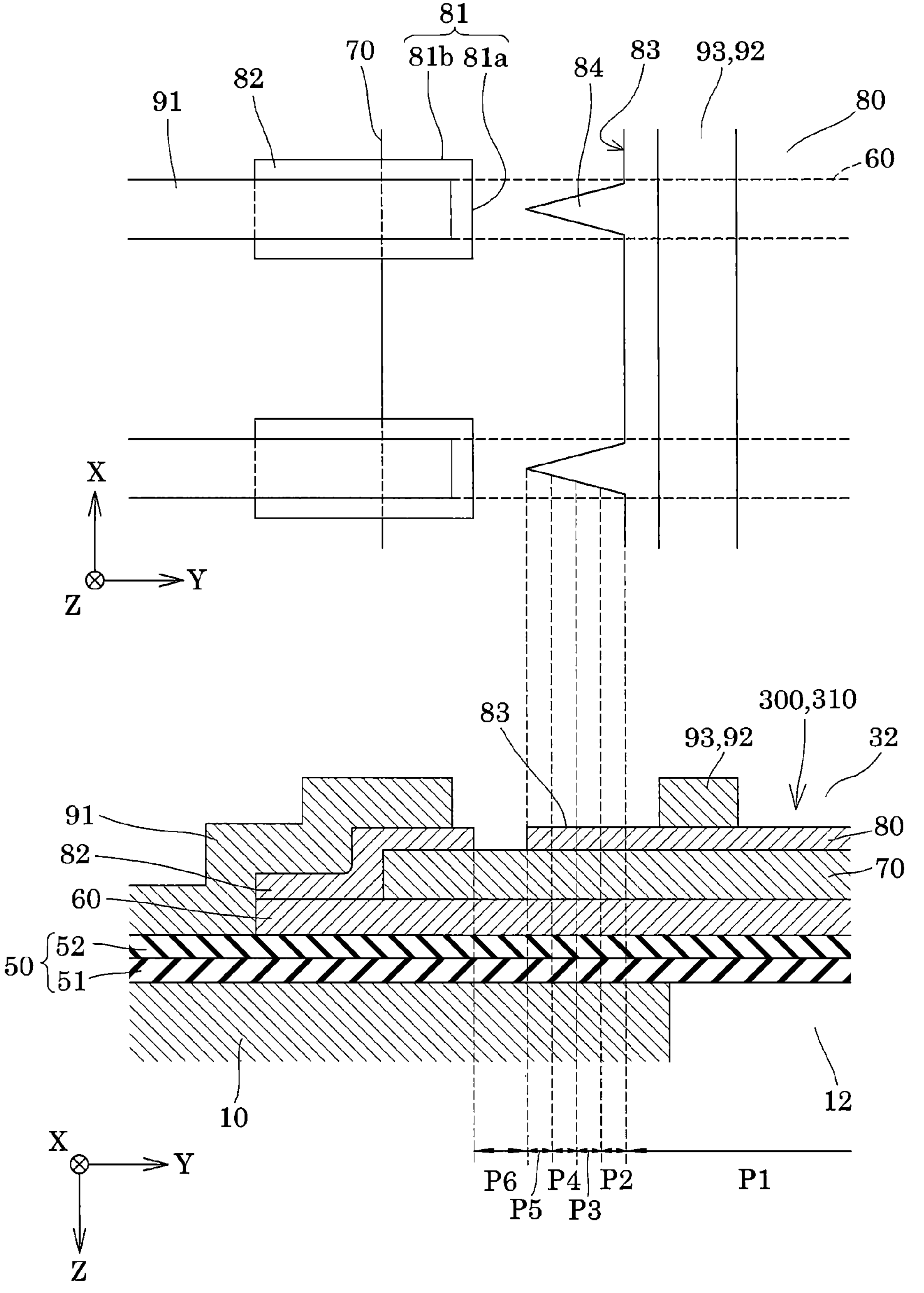
FIG. 5 shows a plan view and a cross-sectional view of an important part of the print head according to Embodiment 1.

FIG. 1 is an exploded perspective view of an ink-jet print head 1 which is an example of a liquid ejecting head of the present embodiment. FIG. 2 is a plan view of a flow-path formed substrate 10 of the print head 1. FIG. 3 is a cross-sectional view of the print head 1 taken along line III-III in FIG. 2. FIG. 4 is a cross-sectional view of the print head 1 taken along line IV-IV in FIG. 2. FIG. 5 shows an enlarged plan view of an important part in FIG. 2 and a cross-sectional view corresponding to the plan view.

As illustrated in the figures, the print head 1 of the present embodiment includes the flow-path formed substrate 10 as an example of a "substrate". The flow-path formed substrate 10 is formed of a silicon substrate, a glass substrate, an SOI substrate, or a substrate of various kinds of ceramics.

The flow-path formed substrate 10 has two rows, arranged in the +Y direction, of a plurality of pressure chambers 12 lined in the +X direction which is the first direction. The pluralities of pressure chambers 12 forming the rows of pressure chambers 12 are arranged in straight lines in the +X direction such that the positions in the +Y direction are aligned. Pressure chambers 12 adjoining to each other in the +X direction are sectioned by a partition wall 11. As a matter of course, the arrangement of the pressure chambers 12 is not particularly limited to this configuration. For example, the pressure chambers 12 may be lined in the +X direction such that every other position is shifted in the +Y direction, which is so-called staggered arrangement.

The pressure chamber 12 of the present embodiment has a rectangular shape as viewed in the +Z direction. As a matter of course, the shape of the pressure chamber 12 viewed in the +Z direction is not limited to a rectangular shape and may be so-called an oval shape such as a rounded rectangular shape, an elliptical shape, and an egg shape having a parallelogram shape or a rectangular shape, as a basic shape, both end portions of which in the longitudinal direction are changed into semicircular shapes, or the shape of the pressure chamber 12 may be a circular shape, a polygonal shape, or the like. This pressure chamber 12 corresponds to a "recess" provided in the "substrate".

Layers of a connection plate 15 and a nozzle plate 20 are provided in this order on the +Z direction side of the flow-path formed substrate 10.

The connection plate 15 is formed of a plate-shaped member and has nozzle-connecting passages 16 passing through the connection plate 15 in the +Z direction and connecting the pressure chambers 12 and nozzles 21.

The connection plate 15 has first manifold portions 17 and second manifold portions 18 which are part of manifolds 100 configured to serve as common liquid chambers that a plurality of pressure chambers 12 are connected in common to. The first manifold portion 17 passes through the connection plate 15 in the +Z direction. The second manifold portion 18 does not pass through the connection plate 15 in the +Z direction and has an open face on the +Z direction side.

The connection plate 15 also has a supply connection passage 19 provided independently for each pressure chamber 12 and connected to an end portion in the Y-axis direction of the pressure chamber 12. The supply connection passage 19 connects the second manifold portion 18 and the pressure chamber 12 and supplies ink in the manifold 100 to the pressure chamber 12.

The connection plate 15 as above can be formed of a silicon substrate, a glass substrate, an SOI substrate, a substrate of various kinds of ceramics, or a metal substrate such as a stainless-steel substrate. Note that the connection plate 15 may be made of a material having substantially the same coefficient of thermal expansion as that of the flow-path formed substrate 10. Use of materials having substantially the same coefficient of thermal expansion for the flow-path formed substrate 10 and the connection plate 15 as above makes it possible to reduce the occurrence of warpage caused by heat due to the difference in the coefficient of thermal expansion.

The nozzle plate 20 is a plate-shaped member and is provided on the face of the connection plate 15 opposite from the flow-path formed substrate 10, in other words, on the +Z direction side.

The nozzle plate 20 has the nozzles 21 configured to be connected to the respective pressure chambers 12 via the nozzle-connecting passages 16. In the present embodiment, the plurality of nozzles 21 form the two nozzle rows away in the +Y direction, each nozzle row including nozzles 21 arranged in a line in the +X direction. Specifically, the plurality of nozzles 21 in the rows are arranged such that the positions in the +Y direction are aligned. As a matter of course, the arrangement of the nozzles 21 is not particularly limited to this configuration. For example, the nozzles 21 lined in the +X direction may be arranged such that every other position is shifted in the +Y direction, which is so-called staggered arrangement. The nozzle plate 20 as above can be formed of a silicon substrate, a glass substrate, an SOI substrate, a substrate of various kinds of ceramics, a metal substrate such as a stainless-steel substrate, or an organic matter such as a polyimide resin. Note that the nozzle plate 20 may be made of a material having substantially the same coefficient of thermal expansion as that of the connection plate 15. Use of materials having substantially the same coefficient of thermal expansion for the nozzle plate 20 and the connection plate 15 as described above makes it possible to reduce the occurrence of warpage caused by heat due to the difference in the coefficient of thermal expansion.

Layers of a vibration plate 50 and a piezoelectric actuator 300 are provided in this order on the −Z direction side of the flow-path formed substrate 10. In other words, the flow-path formed substrate 10, the vibration plate 50, and the piezoelectric actuator 300 are layered in this order in the −Z direction.

The vibration plate 50 includes an elastic film 51 made of silicon oxide provided on the flow-path formed substrate 10 side and an insulator film 52 made of zirconium oxide provided on the elastic film 51. Note that the flow paths such as the pressure chambers 12 provided in the flow-path formed substrate 10 are formed by anisotropically etching the flow-path formed substrate 10 from the face in the +Z direction, and the faces in the −Z direction of the pressure chambers 12 are defined by the elastic film 51. The vibration plate 50 is not limited to the one described above, and for example, the vibration plate 50 may have only the elastic film 51 or may have only the insulator film 52. The vibration plate 50 may include not only the elastic film 51 and the insulator film 52 but also other films. The material of the vibration plate 50 is not limited to the one mentioned above.

The piezoelectric actuator 300 is located on the −Z direction side of the vibration plate 50 and includes layers of first electrodes 60, a piezoelectric layer 70, and a second electrode 80 provided in this order in the −Z direction from the vibration plate 50 side. The piezoelectric actuator 300 serves as a pressure generation unit that causes a pressure change in the ink in the pressure chamber 12. The piezoelectric actuator 300 described above is also referred to as a piezoelectric element, which corresponds to the portion including the first electrodes 60, the piezoelectric layer 70, and the second electrode 80. The portion in which a piezoelectric strain occurs in the piezoelectric layer 70 when a voltage is applied between the first electrode 60 and the second electrode 80 is referred to as an active portion 310. In contrast, the portion in which the piezoelectric strain does not occur in the piezoelectric layer 70 is referred to as an inactive portion. Specifically, the active portion 310 corresponds to the portion in which the piezoelectric layer 70 is held between the first electrode 60 and the second electrode 80. In the present embodiment, the active portion 310 is formed for each pressure chamber 12 which is a recess. This means that the piezoelectric actuator 300 includes a plurality of active portions 310. The present embodiment has two rows, arranged in the +Y direction, of active portions 310 lined in the +X direction so as to be matched to the pressure chambers 12. In the present embodiment, the first electrode 60 serves as an individual electrode independently provided for each active portion 310, and the second electrode 80 serves as a common electrode shared by a plurality of active portions 310. The portions of the piezoelectric actuator 300 that face the pressure chambers 12 in the Z-axis direction are flexible portions, and the surrounding portions not facing the pressure chambers 12 in the Z-axis direction are non-flexible portions.

As illustrated in FIGS. 2 and 4, the first electrode 60 is separately provided for each pressure chamber 12 and serves as an individual electrode independently provided for each active portion 310. The width of the first electrode 60 is smaller than the width of the pressure chamber 12 in the +X direction. In other words, in the +X direction, the end portions of the first electrode 60 are located within the area facing the pressure chamber 12. As illustrated in FIG. 3, in the Y-axis direction, the one end portion of the first electrode 60 on the nozzle 21 side is located outside the pressure chamber 12. This end portion of the first electrode 60 located outside the pressure chamber 12 in the Y-axis direction is coupled to an individual lead electrode 91 which is lead wiring.

As illustrated in FIGS. 2, 3, and 4, the piezoelectric layer 70 has a specified width in the +Y direction and is continuous in the +X direction. The width of the piezoelectric layer 70 in the +Y direction is larger than the length of the pressure chamber 12 in the +Y direction which is the longitudinal direction. Hence, on both side of the pressure chamber 12 in the +Y direction and the −Y direction, the piezoelectric layer 70 extends to the outside of the area facing the pressure chamber 12. The end portion of the piezoelectric layer 70 as above opposite from the nozzle 21 in the Y-axis direction is located outside the end portion of the first electrode 60. In other words, the end portion of the first electrode 60 opposite from the nozzle 21 is covered with the piezoelectric layer 70. The end portion of the piezoelectric layer 70 on the nozzle 21 side is located on the inside of the end portion of the first electrode 60, and hence, the end portion of the first electrode 60 on the nozzle 21 side is not covered with the piezoelectric layer 70. Note that the end portion of the first electrode 60 on the nozzle 21 side, not covered with the piezoelectric layer 70 is, as described above, coupled to the individual lead electrode 91 made of gold (Au) or the like.

The piezoelectric layer 70 has recesses 71 at the positions corresponding to the partition walls 11. The width of this recess 71 in the +X direction is equal to or larger than the width of the partition wall 11. In the present embodiment, the width of the recess 71 in the +X direction is larger than the width of the partition wall 11. This configuration makes low the rigidity of the portions of the vibration plate 50 facing both end portions of the pressure chamber 12 in the +X direction and the −X direction, so-called arms of the vibration plate 50, and this configuration improves the displacement efficiency of the piezoelectric actuator 300. Note that the recess 71 may pass through the piezoelectric layer 70 in the +Z direction which is the thickness direction, or the configuration may be such that the recess 71 extend only to an intermediate position in the piezoelectric layer 70 in the thickness direction instead of passing through the piezoelectric layer 70 in the +Z direction. In other words, the piezoelectric layer 70 may be removed completely, or part of the piezoelectric layer 70 may remain at the bottom face of the recess 71 in the +Z direction.

The piezoelectric layer 70 as above is made of a piezoelectric material including a composite oxide having a perovskite structure expressed by a general formula $ABO_3$. In the present embodiment, lead zirconate titanate (PZT; $Pb(Zr, Ti)O_3$) is used for the piezoelectric material. Use of PZT for the piezoelectric material provides the piezoelectric layer 70 having a relatively large piezoelectric constant d31. Note that the piezoelectric material used for the piezoelectric layer 70 may be a material having a low Pb content, a so-called low-lead material, or a material containing no Pb, a so called lead-free material. Use of a low-lead material for the piezoelectric material reduces the amount of Pb used. Use of a lead-free material for the piezoelectric material eliminates the need for using Pb. Hence, use of a low-lead material or a lead-free material for the piezoelectric material helps reduce the environment load.

As illustrated in FIGS. 2 to 5, the second electrode 80 is located on the −Z direction side of the piezoelectric layer 70, which is the opposite side from the first electrode 60, and forms a common electrode shared by a plurality of active portions 310. The second electrode 80 is located over the faces on the −Z direction side of the piezoelectric layer 70 parallel to the XY plane defined by the X-axis and the Y-axis, the side faces of the piezoelectric layer 70, in other words, the faces intersecting the foregoing XY plane, and the faces of the first electrodes 60 not covered with the piezoelectric layer 70. The second electrode 80 has a removed portion 81 passing through the second electrode 80 in the Z-axis direction which is the thickness direction, on the piezoelectric layer 70. The removed portion 81, which is located on the nozzle 21 side of the piezoelectric layer 70 and is continuous in the X-axis direction, electrically separates the second electrode 80 in the Y-axis direction into the portion located on the first electrode 60 and the portion on the opposite side. In the following description, the portion separated by the removed portion 81 from the portion located on the first electrode 60 is referred to as a second electrode 80. The portion having the same layer as this second electrode 80, extending over the first electrode 60 not covered with the piezoelectric layer 70 and the face in the −Z direction of the piezoelectric layer 70, and electrically separated by the removed portion 81 from the second electrode 80 is referred to as a third electrode 82. In the present embodiment, this third electrode 82 corresponds to a “coupling electrode” electrically coupled to the first electrode 60. Although the second electrode 80 and the third electrode 82 are formed of the same layer in the present embodiment, the present disclosure is not particularly limited to this configuration. The second electrode 80 and the third electrode 82 may be formed of different layers. Here, example of configurations in which the second electrode 80 and the third electrode 82 are different layers include the configuration in which these layers are formed of the same material but in different processes and the configuration in which these layers are formed of different materials and in different processes.

As illustrated in FIG. 5, the third electrode 82 coupled to the first electrode 60 is separately provided so as to be matched to each first electrode 60. Specifically, the third electrode 82 is not continuous in the +X direction, but a plurality of third electrodes 82 are arranged side by side in the +X direction at regular intervals. With this configuration, it is possible to prevent the plurality of first electrodes 60 from being electrically continuous via the third electrode 82. Specifically, the removed portion 81 of the present embodiment has a first removed portion 81*a* and a second removed portion 81*b*. The first removed portion 81*a* is continuous in the +X direction on the face in the −Z direction of the piezoelectric layer 70. The first removed portion 81*a* is located on the nozzle 21 end portion side of the piezoelectric layer 70 in the Y-axis direction at a position a little away from this end portion of the piezoelectric layer 70. This first removed portion 81*a* separates the third electrode 82 on the first electrode 60 and the second electrode 80, so that the first electrode 60 and the second electrode 80 are not electrically continuous with each other.

The second removed portion 81*b* is located on the face in the −Z direction of the piezoelectric layer 70 between the first electrodes 60 adjoining to each other in the +X direction and has one end connected to the first removed portion 81*a* and the other end extending in the Y-axis direction to the end portion in the Y-axis direction of the piezoelectric layer 70. A plurality of second removed portions 81*b* are arranged in the +X direction at regular intervals. These second removed portions 81*b* section the third electrode 82 such that each electrode 82 is matched to the corresponding first electrode 60, so that the plurality of first electrodes 60 are not electrically continuous. Specifically, the removed portion 81, having the first removed portions 81*a* and the second removed portions 81*b*, has substantially a comb tooth shape as viewed in the +Z direction.

The end portion of the active portion 310 on the nozzle 21 side in the Y-axis direction is defined by the end portion of the second electrode 80, formed by the first removed portion 81*a*. Specifically, the first electrode 60 extends in the Y-axis direction over the end portion on the removed portion 81 side of the second electrode 80, and the end portion on the nozzle 21 side of the active portion 310 is defined by the end portion on the first removed portion 81*a* side of the second electrode 80.

Here, the second electrode 80 has a first end portion 83 formed by the first removed portion 81*a* and serving as a reference and protruding portions 84 protruding beyond the first end portion 83 toward the third electrodes 82.

The first end portion 83 has a straight line shape along the X-axis. The first end portion 83 means substantially an end portion of the non-active portion.

The protruding portion 84 protrudes from the end portion of the active portion 310 beyond the first end portion 83 toward the third electrode 82. The statement that the protruding portion 84 protrudes from the end portion of the active portion 310 means that the base of the protruding portion 84 is provided so as to overlap the first electrode 60 as viewed in the +Z direction along the Z-axis. Note that the base of the protruding portion 84 corresponds to the portion of the protruding portion 84 connected to the first end portion 83 in the Y-axis direction. In other words, the statement that the base of the protruding portion 84 is located at a position where the base overlaps the first electrode 60 as viewed in the +Z direction means that the connecting portion of the protruding portion 84 and the first end portion 83 overlaps the first electrode 60 as viewed in the +Z direction. Note that in the present embodiment, the width in the X-axis direction of the base of the protruding portion 84 is smaller than that of the first electrode 60.

The end portion of the active portion 310 and the third electrode 82 are arranged to be opposed to each other in the Y-axis direction which is the longitudinal direction of the pressure chamber 12. In other words, the end portion of the active portion 310 and the third electrode 82 are located at the same position in the X-axis direction. Thus, the direction in which the protruding portion 84 protrudes toward the third electrode 82 is aligned with the Y-axis direction.

The protruding portion 84 as above has a width in the X-axis direction, which is a direction orthogonal to the protruding direction, gradually decreasing toward the third electrode 82. In other words, the protruding portion 84 has a shape in which the area per unit length in the Y-axis direction decreases as the position approaches the distal end, a so-called tapered shape. Note that the shape of the protruding portion 84 is not limited to this one, and the protruding portion 84 may have a shape including a straight portion having a straight shape the width of which in the X-axis direction is constant and a tapered portion having a tapered shape the width of which in the X-axis direction gradually decreases toward the third electrode 82. When the protruding portion 84 includes a straight portion and a tapered portion, the configuration may be such that the straight portion is located on the first end portion 83 side and the tapered portion is located on the third electrode 82 side, or these positions may be reversed.

In the protruding portion 84 in the present embodiment, the distal end is also located so as to overlap the first electrode 60 as viewed in the +Z direction. In other words, the protruding portion 84 is located at a position where the entire protruding portion 84 overlaps the first electrode 60 as viewed in the +Z direction.

As described above, since the second electrode 80 has the protruding portion 84, the electrical resistance value can be increased gradually toward the distal end of the protruding portion 84. In other words, when the portion on the inside, in other words, on the pressure chamber 12 side of the first end portion 83 of the second electrode 80 illustrated in FIG. 5 is referred to as a first area P1, and the first removed portion 81*a* is referred to as a sixth area P6, the electrical resistance value of the protruding portion 84 gradually increases as the position approaches from the first area P1 toward the sixth area P6 in the Y-axis direction. In the present embodiment, since the width in the X-axis direction of the protruding portion 84 is smaller than the width on the first end portion 83 side of the second electrode 80, the electrical resistance value of the protruding portion 84 gradually increases toward the third electrode 82. Also since the width in the X-axis direction of the protruding portion 84 gradually decreases toward the third electrode 82, the cross-sectional area of the protruding portion 84 in the direction crossing the protruding direction gradually decreases toward the third electrode 82. Also for this reason, the electrical resistance value of the protruding portion 84 gradually increases toward the third electrode 82. Specifically, When it is assumed that the protruding portion 84 is divided into four areas in the Y-axis direction: a second area P2, a third area P3, a fourth area P4, and a fifth area P5, the electrical resistance value of the second area P2 is larger than that of the first area P1, and the electrical resistance value of the third area P3 is larger than that of the second area P2. The electrical resistance value of the fourth area P4 is larger than that of the third area P3. The electrical resistance value of the fifth area P5 is larger than that of the fourth area P4. Thus, the voltage applied to the protruding portion 84 gradually decreases, compared to the voltage applied to the first area P1, from the second area P2 toward the fifth area P5. Thus, the electric field applied to the active portion 310 can be gradually reduced, compared to that to the first area P1, from the second area P2 toward the fifth area P5 of the protruding portion 84. As a result, the stress applied to the piezoelectric layer 70, when the active portion 310 is driven and seeking to deform, gradually decreases from the first area P1 toward the fifth area P5 which is the distal end of the protruding portion 84, and this reduces stress concentration in the piezoelectric layer 70. In addition, because the electric field applied to the active portion 310 is sufficiently lower in the fifth area P5 than in the first area P1, it is possible to reduce the stress concentration caused at the boundary portion between the fifth area P5 and the sixth area P6 when the active portion 310 is driven. Since it is possible to reduce the stress concentration at the boundary portion between the active portion 310 and the inactive portion, in other words, the sixth area P6, it is possible to prevent or reduce the occurrence of damage such as cracks in the piezoelectric layer 70, and this prevents or reduces the occurrence of leak current between the first electrode 60 and the second electrode 80 along the cracks. This makes it possible to prevent or reduce the occurrence of drive failures in the active portion 310 that would be caused by damage to the piezoelectric layer 70.

Note that the end portion of the active portion 310 opposite from the nozzle 21 in the Y-axis direction is defined by the end portion of the first electrode 60. Specifically, the second electrode 80 extends in the Y-axis direction beyond the end portion of the first electrode 60 opposite from the nozzle 21, and the end portion of the active portion 310 opposite from the nozzle 21 is defined by the end portion of the first electrode 60. Because the first electrode 60 defining the end portion of this active portion 310 opposite from the nozzle 21 in the Y-axis direction is located near the neutral axis of the vibration plate 50 and the piezoelectric element 300, and the piezoelectric layer 70, the second electrode 80, and the like are formed on the −Z direction side, the stress concentration is less likely to occur, and damage to the piezoelectric layer 70 is less likely to occur.

The second electrode 80 in the present embodiment is present also on the side faces of the recesses 71 of the piezoelectric layer 70 and on the vibration plate 50 at the bottom faces of the recesses 71. As a matter of course, the second electrode 80 may be provided on part of the inner face of the recess 71, or the configuration may be such that the second electrode 80 is not provided on any part of the inner face of the recess 71.

The first electrode 60 and the second electrode 80 of the piezoelectric actuator 300 are coupled to the individual lead electrode 91 and a common lead electrode 92, respectively, which are lead wiring of the present embodiment. The individual lead electrode 91 and the common lead electrode 92 (hereinafter, these are collectively referred to as the lead electrodes 90) in the present embodiment are formed of the same layer but are electrically discontinuous. The material for the lead electrodes 90 as above is not particularly limited to any specific material as long as it is conductive. For example, the material for the lead electrodes 90 may be gold (Au), platinum (Pt), aluminum (Al), cupper (Cu), or the like. In addition, the lead electrodes 90 may have an adhesion layer for improving the adhesion to the first electrode 60, the second electrode 80, and the vibration plate 50. In the present embodiment, the lead electrodes 90 are made of gold (Au). Specifically, the upper most layer of the lead electrodes 90 contains gold (Au).

The individual lead electrode 91 extends from the first electrode 60 located on the outside of the piezoelectric layer 70 to a position on the vibration plate 50 in the Y-axis direction. In other words, the individual lead electrode 91 extends in the Y-axis direction from the end portion on the nozzle 21 side of the first electrode 60 toward a position on the vibration plate 50. In FIG. 2, part of the individual lead electrode 91 bends, but as a matter of course, the present disclosure is not limited to this configuration, and the individual lead electrode 91 may be in a straight line in the Y-axis direction. In addition, the individual lead electrode 91 extends in the Y-axis direction from a position on the first electrode 60 to a position on the third electrode 82. The individual lead electrode 91 does not cover the end portion on the removed portion 81 side of the third electrode 82 and is provided only on the third electrode 82. When a protection substrate 30 is joined to the −Z direction side of the flow-path formed substrate 10, the individual lead electrodes 91 extending on the third electrodes 82 serve to make the height of the adhesion face on which an adhesive 130 is to be attached aligned with that of an extension portion 93 described later, and this prevents or reduces the occurrence of the variation in the thickness of the adhesive 130.

The common lead electrode 92 extends at both end portions of the second electrode 80 in the X-axis direction, specifically, at an end portion in the +X direction and an end portion in the −X direction, from positions on the second electrode 80 to positions on the vibration plate 50 in the Y-axis direction.

The common lead electrode 92 has the extension portions 93 provided above the wall faces of the pressure chambers 12 in the Y-axis direction, spanning across the boundary portions between the flexible portions and the non-flexible portions. The extension portions 93 extend continuously on the second electrode 80 across a plurality of active portions 310 in the +X direction and are connected to the common lead electrode 92 at both end portions in the X-axis direction. Specifically, the common lead electrode 92 having the extension portions 93 is continuously provided so as to surround the active portions 310 in a plan view from the protection substrate 30 side. In other words, the extension portions 93 correspond to the two portions extending in the X-axis direction, out of the common lead electrode 92. The extension portion 93 does not cover the end portion on the removed portion 81 side of the second electrode 80 and is located on the pressure chamber 12 side of the end portion of the second electrode 80 on the removed portion 81 side in the Y-axis direction.

Since the common lead electrode 92 has the extension portions 93 as described above, it is possible to reduce the voltage drop in the X-axis direction in the second electrode 80 and thus to reduce deterioration and variation in the ejection characteristics of the ink ejected from the nozzles 21. In particular, since the extension portions 93 are provided at both end portions of the active portion 310 in the Y-axis direction in the present embodiment, it is possible to increase the cross-sectional area of the extension portions 93 along the YZ plane defined by the Y-axis and the Z-axis and thus to make the electrical resistance value relatively small. Thus, it is possible to effectively reduce the voltage drop. Since the extension portion 93 is provided at a position overlapping the boundary between the flexible portion and the non-flexible portion as viewed in the +Z direction, the rigidity of the boundary between the flexible portion and the non-flexible portion increases, and thus, it is possible to prevent or reduce the damage to the piezoelectric layer 70 due to the stress concentration that occurs at the boundary between the flexible portion and the non-flexible portion. In addition, since in the Y-axis direction, the extension portions 93 are provided at both end portion sides of the active portion 310 where the deformation is relatively small and are not provided at the center portion where the deformation is relatively large, it is possible to prevent the extension portions 93 from impeding the deformation of the active portion 310 or reduce such impediment and to prevent or reduce a significant decrease in the deformation degree of the piezoelectric actuator 300. In addition, the extension portions 93 help adjust the adhesion height of the protection substrate 30 on the −Z direction side.

Note that as described above, a flexible wiring substrate 121 is coupled to the individual lead electrodes 91 and the end portion of the common lead electrode 92 on the opposite side from the end portion coupled to the piezoelectric actuator 300. The wiring substrate 121 has a drive circuit 120 including switching elements for driving the piezoelectric actuators 300.

On the −Z direction side of the flow-path formed substrate 10 which is the one side on which the piezoelectric actuators 300 are provided as above, the protection substrate 30 having substantially the same size as the flow-path formed substrate 10 is attached with the adhesive 130 as illustrated in FIG. 3. In the present embodiment, the protection substrate 30 is attached to the piezoelectric actuators 300 with the adhesive 130. The adhesive 130 is provided so as to adhere to the extension portions 93, the removed portions 81, and the like of the piezoelectric actuators 300.

As illustrated in FIG. 3, the protection substrate 30 has a through hole 32 passing through the protection substrate 30 in the +Z direction at a position overlapping the portion between the two rows of the piezoelectric actuators 300 as viewed in the +Z direction. The end portions of the individual lead electrodes 91 and the common lead electrodes 92 routed from the electrodes of the piezoelectric actuators 300 extend so as to be exposed in this through hole 32. The individual lead electrodes 91 and the common lead electrodes 92 are electrically coupled to the wiring substrate 121 in the through hole 32.

A case member 40 having manifolds 100 connected to the plurality of pressure chambers 12 is fixed on the −Z direction side of the protection substrate 30. The case member 40, which has substantially the same shape as the foregoing connection plate 15 in plan view, is joined to the protection substrate 30 and also joined to the foregoing connection plate 15.

The case member 40 as above has a recess 41 having an open face in the +Z direction and having such a depth that the recess 41 can house the flow-path formed substrate 10 and the protection substrate 30. This recess 41 has an open area larger than the face of the protection substrate 30 joined to the flow-path formed substrate 10. Then, the flow-path formed substrate 10, the protection substrate 30, and the like are placed in the recess 41, and the open face of the recess 41 on the nozzle plate 20 side is sealed with the connection plate 15. In addition, the case member 40 has third manifold portions 42 on both outsides of the recess 41 in the Y-axis direction, in other words, on the outside in the +Y direction and on the outside in the −Y direction, and the third manifold portions 42 are grooves open in the +Z direction. The third manifold portion 42 has substantially the same open area as the opening on the −Z direction side of the first manifold portion 17 formed in the connection plate 15, and the third manifold portion 42 and the first manifold portion 17 are connected by joining the case member 40 to the connection plate 15. The third manifold portion 42 in this case member 40 and the first manifold portion 17 and the second manifold portion 18 in the connection plate 15 form the manifold 100 in the present embodiment. The manifold 100 is continuous in the +X direction in which the pressure chambers 12 are lined, and the supply connection passages 19 connecting the pressure chambers 12 and the manifold 100 are lined in the +X direction.

In addition, the case member 40 has inlets 44 formed on the −Z direction side of the third manifold portions 42 and connected to the manifolds 100 to supply ink to the manifolds 100. The case member 40 also has a coupling opening 43 that is connected to the through hole 32 of the protection substrate 30 and into which the wiring substrate 121 inserted.

A compliance substrate 45 is provided on the +Z direction side face of the connection plate 15 in which the first manifold portions 17 and the second manifold portions 18 are open. This compliance substrate 45 seals the openings on the +Z direction side of the first manifold portions 17 and the second manifold portions 18. In the present embodiment, the compliance substrate 45 as above includes a sealing film 46 formed of a flexible thin film and a fixation substrate 47 formed of a hard material such as a metal. The areas of the fixation substrate 47 facing the manifolds 100 are openings 48 in which the material is completely removed in the thickness direction, and hence, the one face of each manifold 100 is a compliance portion 49 which is a flexible portion sealed only with the flexible sealing film 46.

In the print head 1 in the present embodiment as above, ink is supplied from the inlets 44 connected to an external ink supply unit (not illustrated) until the inside portion from the manifolds 100 to the nozzles 21 is filled with ink, and then, voltage is applied between the first electrodes 60 and the second electrodes 80 associated with the pressure chambers 12 according to print signals from the drive circuit 120. With this operation, the vibration plate 50 together with the piezoelectric actuators 300 deforms in a bending manner, and this increases the pressure inside the pressure chambers 12, causing the nozzles 21 to eject ink.

As has been described above, the print head 1 which is an example of a piezoelectric device of the disclosure of the present application includes the flow-path formed substrate 10 which is a substrate having the plurality of pressure chambers 12 which are recesses; a vibration plate 50 provided on one side of the flow-path formed substrate 10; the piezoelectric actuators 300 including layers of the first electrodes 60, the piezoelectric layer 70, and the second electrode 80 provided in this order on the vibration plate 50 side. The piezoelectric actuator 300 has the plurality of active portions 310 in which the piezoelectric layer 70 is held between the first electrodes 60 and the second electrode 80. The first electrodes 60 each serve as an individual electrode individually provided for the corresponding active portion 310, and the second electrode 80 serves as a common electrode shared by the plurality of active portions. Then, the second electrode 80 includes the first end portion 83 serving as a reference and the protruding portions 84 protruding from end portions of the active portions 310 beyond the first end portion 83 toward the third electrodes 82 which are coupling electrodes electrically coupled to the first electrodes 60.

Since the second electrode 80 has the protruding portions 84 as described above, it is possible to gradually increase the electrical resistance value of the protruding portion 84 toward the distal end, in comparison to the electrical resistance value on the first end portion 83 side. Thus, it is possible to gradually reduce the voltage applied to the protruding portion 84 toward the distal end, and to gradually reduce the strength of the electric field applied to the end portion of the active portion 310 toward the distal end of the protruding portion 84. As a result, the stress applied to the end portion of the active portion 310 can be dispersed, and this makes it possible to prevent or reduce the occurrence of damage such as cracks in the piezoelectric layer 70 due to stress concentration and the occurrence of drive failures in the active portions 310 that would be caused by the occurrence of leak current between the first electrode 60 and the second electrode 80 along cracks.

In the print head 1 of the present embodiment, the width of the protruding portion 84 in the X-axis direction which is a direction orthogonal to the protruding direction may gradually decrease toward the third electrode 82 which is a coupling electrode. With this configuration, it is possible to gradually further increase the electrical resistance value of the protruding portion 84 toward the third electrode 82, and this prevents or reduces stress concentration effectively at the end portion of the active portion 310.

In addition, in the print head 1 of the present embodiment, the base of the protruding portion 84 may overlap the first electrode 60 as viewed in the +Z direction which is the stacking direction of the piezoelectric actuator 300 and the flow-path formed substrate 10 which is a substrate. With this configuration, the protruding portion 84 can protrude from the end portion of the active portion 310, and the protruding portion 84 can prevent or reduce stress concentration at the end portion of the active portion 310.

Although in the present embodiment, the protruding portion 84 is located at a position where the entire protruding portion 84 overlaps the first electrode 60 as viewed in the +Z direction, the disclosure is not particularly limited to this configuration. As for the protruding portion 84, as long as at least the base is located so as to overlap the first electrode 60 as viewed in the +Z direction, the distal end does not have to be located so as to overlap the first electrode 60. This is because even if the distal end of the protruding portion 84 is located so as not to overlap the first electrode 60 as viewed in the +Z direction, the electrical resistance value of the protruding portion 84 gradually increases toward the distal end, and also in the area of the protruding portion 84 that overlaps the first electrode 60 as viewed in the +Z direction, the electrical resistance value gradually increases toward the third electrode 82.

Embodiment 2

Figure 6:
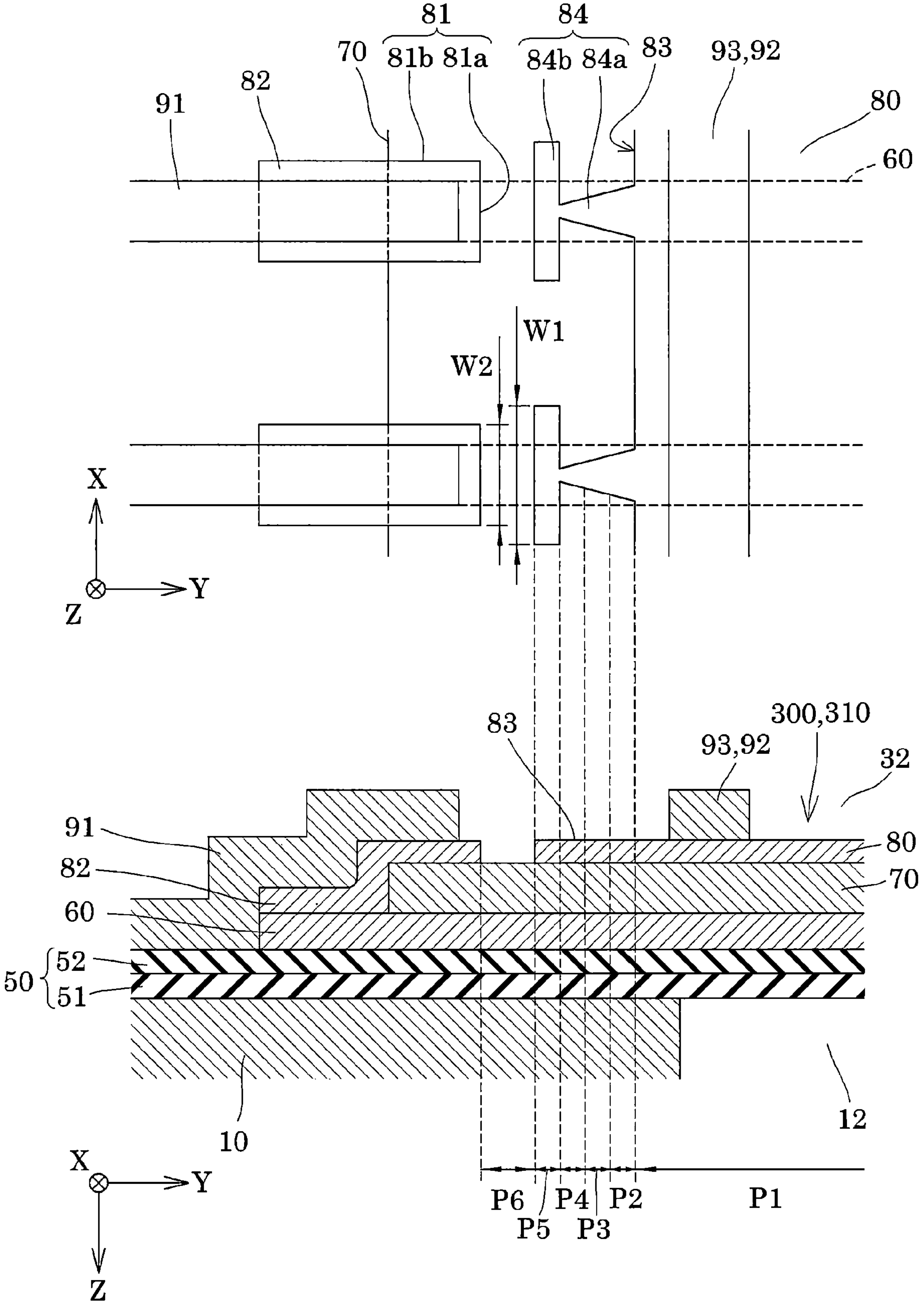
FIG. 6 shows a plan view and a cross-sectional view of an important part of a print head according to Embodiment 2.

FIG. 6 shows an enlarged plan view of an important part of a flow-path formed substrate 10 of an ink-jet print head 1 which is an example of a liquid ejecting head according to Embodiment 2 of the present disclosure and a cross-sectional view corresponding to the plan view. Note that the members the same as or similar to those in the foregoing embodiment are denoted by the same reference numerals, and repetitive description is omitted.

A protruding portion 84 of the second electrode 80 has a first protruding portion 84*a* and a parallel portion 84*b*.

The first protruding portion 84*a* has a shape the same as or similar to the protruding portion 84 in the foregoing Embodiment 1. In other words, the first protruding portion 84*a* protrudes from an end portion of the active portion 310 beyond the first end portion 83 toward the third electrode 82. The first protruding portion 84*a* has a tapered shape the width of which in the X-axis direction which is a direction orthogonal to the protruding direction gradually decreases toward the third electrode 82. In addition, in the first protruding portion 84*a* in the present embodiment, the distal end is also located so as to overlap the first electrode 60 as viewed in the +Z direction. In other words, the entire part of the first protruding portion 84*a* overlaps the first electrode 60 as viewed in the +Z direction.

The parallel portion 84*b* is continuous to the distal end of the first protruding portion 84*a* and parallel to the end face on the second electrode 80 side of the third electrode 82. Specifically, the statement that the parallel portion 84*b* is parallel to the third electrode 82 means that the distance between the parallel portion 84*b* and the third electrode 82 in the Y-axis direction which is the protruding direction of the protruding portion 84 is constant along the X-axis. In the present embodiment, since the end face of the third electrode 82 on the second electrode 80 side in the Y-axis direction has a straight line shape along the X-axis, the end face of the parallel portion 84*b* on the third electrode 82 side has a straight line shape along the X-axis. The width in the Y-axis direction of the parallel portion 84*b* is constant along the X-axis. In other words, the parallel portion 84*b* in the present embodiment has the same width in the X-axis direction along a straight line along the X-axis.

The width W1 along the X-axis of the parallel portion 84*b* may be larger than or equal to the width W2 of the third electrode 82. In other words, the width W1 of the parallel portion 84*b* and the width W2 of the third electrode 82 may satisfy W1≥W2. The width W1 of the parallel portion 84*b* is larger than the width in the X-axis direction of the first protruding portion 84*a*. In other words, the width of the protruding portion 84 is largest at the parallel portion 84*b* which is the distal end portion.

As described above, in the print head 1 which is an example of a piezoelectric device of the present embodiment, the distal end of the protruding portion 84 has the parallel portion 84*b* parallel to the third electrode 82 which is a coupling electrode. Since the protruding portion 84 has the parallel portion 84*b* parallel to the third electrode 82 as described above, the electric field between the third electrode 82 and the protruding portion 84 is applied to the parallel portion 84*b* along the X-axis. Thus, it is possible to prevent or reduce concentration of the electric field between the protruding portion 84 and the third electrode 82 at one place of the protruding portion 84, and this prevents or reduces the occurrence of a short circuit between the third electrode 82 and the protruding portion 84. In the protruding portion 84, the electrical resistance value can be increased toward the distal end by the presence of the first protruding portion 84*a*, and thus, even though the electrical resistance value of the parallel portion 84*b* is larger than the first protruding portion 84*a*, the voltage applied can be reduced toward the distal end by the presence of the first protruding portion 84*a*, and it is possible to sufficiently reduce the voltage applied to the parallel portion 84*b*. The portion of the second electrode 80 on the inside of the first end portion 83, in other words, on the pressure chamber 12 side, is referred to as the first area P1, the first removed portion 81*a* is referred to as the sixth area P6, the first protruding portion 84*a* of the protruding portion 84 is referred to as the second area P2, the third area P3, and the fourth area P4 from the first area P1 side, and the area of the parallel portion 84*b* is referred to as the fifth area P5. Although in this case, the electrical resistance value of the fifth area P5 where the parallel portion 84*b* of the protruding portion 84 is provided is larger than those of the second area P2, the third area P3, and the fourth area P4, since the voltage is sufficiently low at the fourth area P4, the voltage applied to the parallel portion 84*b* which is the fifth area P5 is equal to or lower than that applied to the fourth area P4. Hence, even though the parallel portion 84*b* is present, the presence of the protruding portion 84 enables the electric field applied to the end portion of the active portion 310 to gradually decreases toward the distal end of the protruding portion 84, and thus it is possible to prevent or reduce the occurrence of stress concentration at the end portion of the active portion 310, the occurrence of damage such as cracks in the piezoelectric layer 70, and the occurrence of drive failures in the active portions 310 that would be caused by leak current along the cracks. Although in the present embodiment, the protruding portion 84 has the first protruding portion 84*a* and the parallel portion 84*b*, the width in the X-axis direction of the first protruding portion 84*a* on the parallel portion 84*b* side may be equal to the width of the parallel portion 84*b*. In other words, the parallel portion may be formed such that the entire protruding portion 84 has a tapered shape the width of which in the X-axis direction gradually increases. As a matter of course, the protruding portion 84 may have a shape partially including a straight portion having a straight line shape the width of which in the X-axis direction is constant.

In the print head 1 of the present embodiment, the width W1 of the parallel portion 84*b* in the X-axis direction which is a direction orthogonal to the protruding direction of the protruding portion 84 may be larger than or equal to the width W2 of the third electrode 82 which is a coupling electrode. When the width W1 of the parallel portion 84*b* is larger than or equal to the width W2 of the third electrode 82 as described above, it is possible to disperse the electric field applied to the parallel portion 84*b* along the X-axis, and this further prevents or reduces the occurrence of a short circuit between the third electrode 82 and the protruding portion 84.

In the print head 1 of the present embodiment, the width of the protruding portion 84 in the X-axis direction which is a direction orthogonal to the protruding direction may be largest at the distal end. In other words, when the protruding portion 84 includes the first protruding portion 84*a* and the parallel portion 84*b* having a width larger than the first protruding portion 84*a*, in comparison to the case in which the protruding portion 84 has only a parallel portion 84*b*, it is possible to cause a voltage drop toward the distal end by the presence of the first protruding portion 84*a*, and this also prevents or reduces the occurrence of concentration of the electric field at the parallel portion 84*b* which is the distal end of the protruding portion 84.

Figure 7:
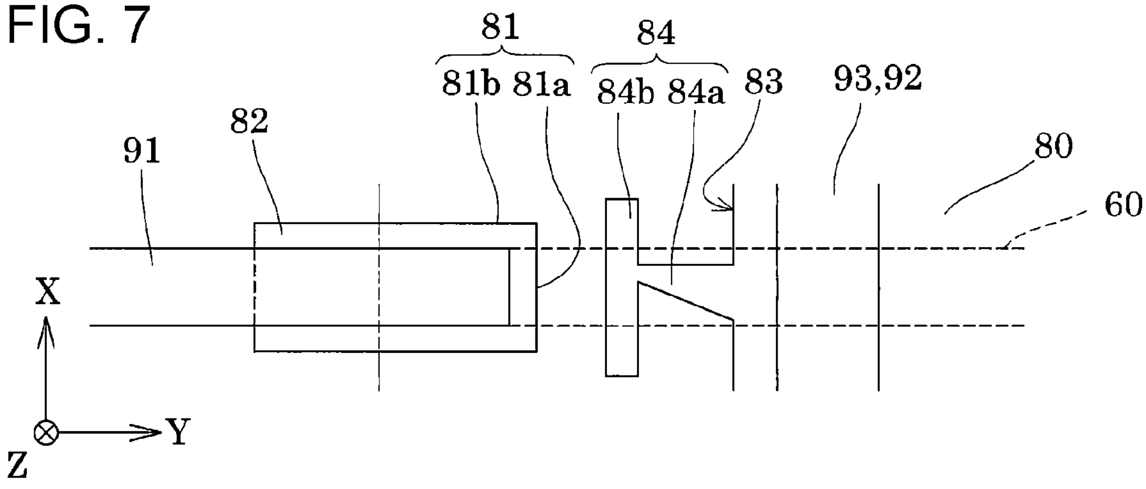
FIG. 7 is a plan view of an important part of a modification example of the print head according to Embodiment 2.
Figure 8:
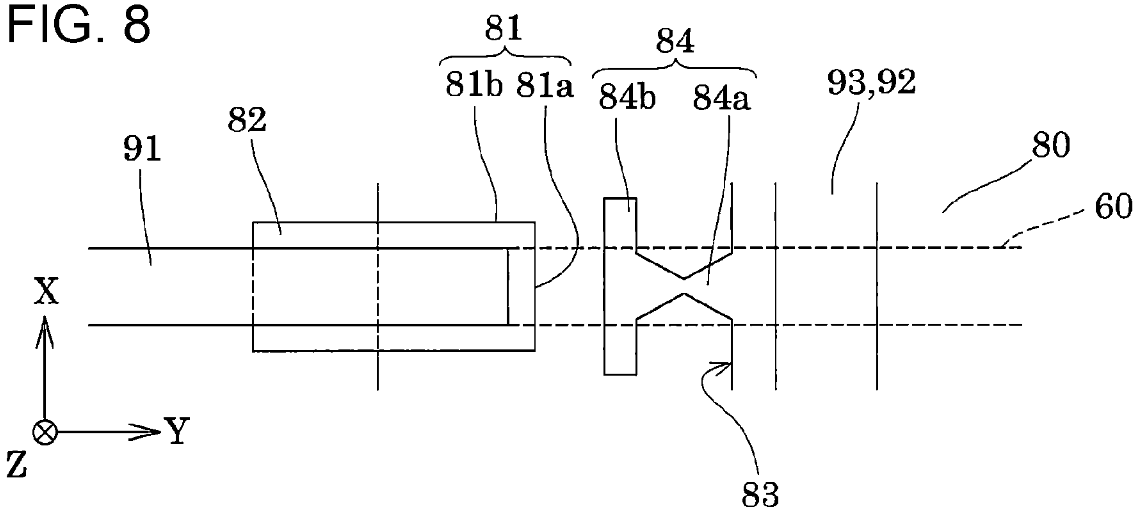
FIG. 8 is a plan view of an important part of a modification example of the print head according to Embodiment 2.
Figure 9:
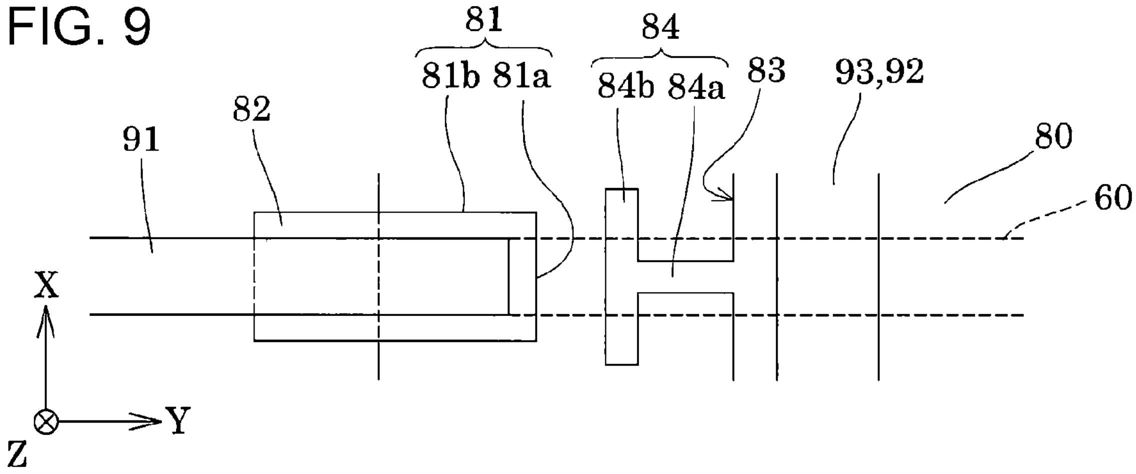
FIG. 9 is a plan view of an important part of a modification example of the print head according to Embodiment 2.

Although the first protruding portion 84*a* in the present embodiment has a tapered shape in which both sides in the X-axis direction are narrowed toward the distal end, the disclosure is not particularly limited to this configuration. Here, FIGS. 7 to 9 show modification examples of the protruding portion 84. FIGS. 7 to 9 are plan views of an important part of the flow-path formed substrate 10 for explaining the modification examples of the protruding portion 84.

As illustrated in FIG. 7, a protruding portion 84 includes a first protruding portion 84*a* and a parallel portion 84*b*, and the first protruding portion 84*a* has a tapered shape in which one side in the X-axis is narrowed toward the distal end, in other words, a tapered shape in which the side face in the +X direction of the first protruding portion 84*a* is parallel to the Y-axis, and the side face in the −X direction is inclined with respect to the Y-axis, so that the width gradually decreases toward the distal end. The first protruding portion 84*a* having a shape in which one side in the X-axis is narrowed as described above can also provide effects the same as or similar to those of the foregoing one.

As illustrated in FIG. 8, a protruding portion 84 has a first protruding portion 84*a* and a parallel portion 84*b*. The first protruding portion 84*a* has a shape in which the width in the X-axis direction gradually decreases toward the distal end and, from an intermediate position, gradually increases. The first protruding portion 84*a* having a shape in which the width increases from an intermediate position as described above can also provide effects the same as or similar to those of the foregoing one.

As illustrated in FIG. 9, a protruding portion 84 has a first protruding portion 84*a* and a parallel portion 84*b*. In the first protruding portion 84*a*, the width in the X-axis direction is constant along the Y-axis. The first protruding portion 84*a* having such a shape can provide effects the same as or similar to those of the one in FIG. 6 although the degree to which the electrical resistance value increases toward the distal end is smaller than that of the first protruding portion 84*a* illustrated in FIG. 6. In other words, in the first protruding portion 84*a*, even if the width is constant along the Y-axis, the electrical resistance value becomes larger as the position approaches the distal end, than that of the first end portion 83, and thus the closer to the distal end, a larger voltage drop occurs. Hence, even if the first protruding portion 84*a* has a width constant along the Y-axis, the strength of the electric field applied the end portion of the active portion 310 can be gradually reduced. Thus, it is possible to prevent or reduce the occurrence of stress concentration at the end portion of the active portion 310, and this in turn prevents or reduces leak current or burning that would be caused by the damage to the piezoelectric layer 70.

As a matter of course, the first protruding portions 84*a* illustrated in FIGS. 7 to 9 may be applied to the protruding portion 84 in the foregoing Embodiment 1.

Other Embodiments

Although the embodiments of the present disclosure have been described above, the basic configuration of the present disclosure is not limited to the foregoing ones.

For example, although the protruding portions 84 are formed as part of the second electrode 80 in the foregoing embodiments, the disclosure is not particularly limited to this configuration. The protruding portions 84 may be formed of a layer different from the second electrode 80, for example, the common lead electrode 92 or another layer. In other words, as long as the protruding portions 84 are electrically coupled to the second electrode 80, the protruding portions 84 substantially serve as part of the second electrode 80.

In addition, for example, although the protruding portion 84 in the foregoing Embodiment 1 and the first protruding portion 84*a* in Embodiment 2 illustrated in FIGS. 6 to 8 have tapered shapes the width of which in the X-axis direction gradually decreases toward the distal end, the disclosure is not particularly limited to this configuration. The protruding portion 84 may have a shape the width of which in the X-axis direction decreases stepwise toward the distal end, a so-called stepped shape.

Figure 10:
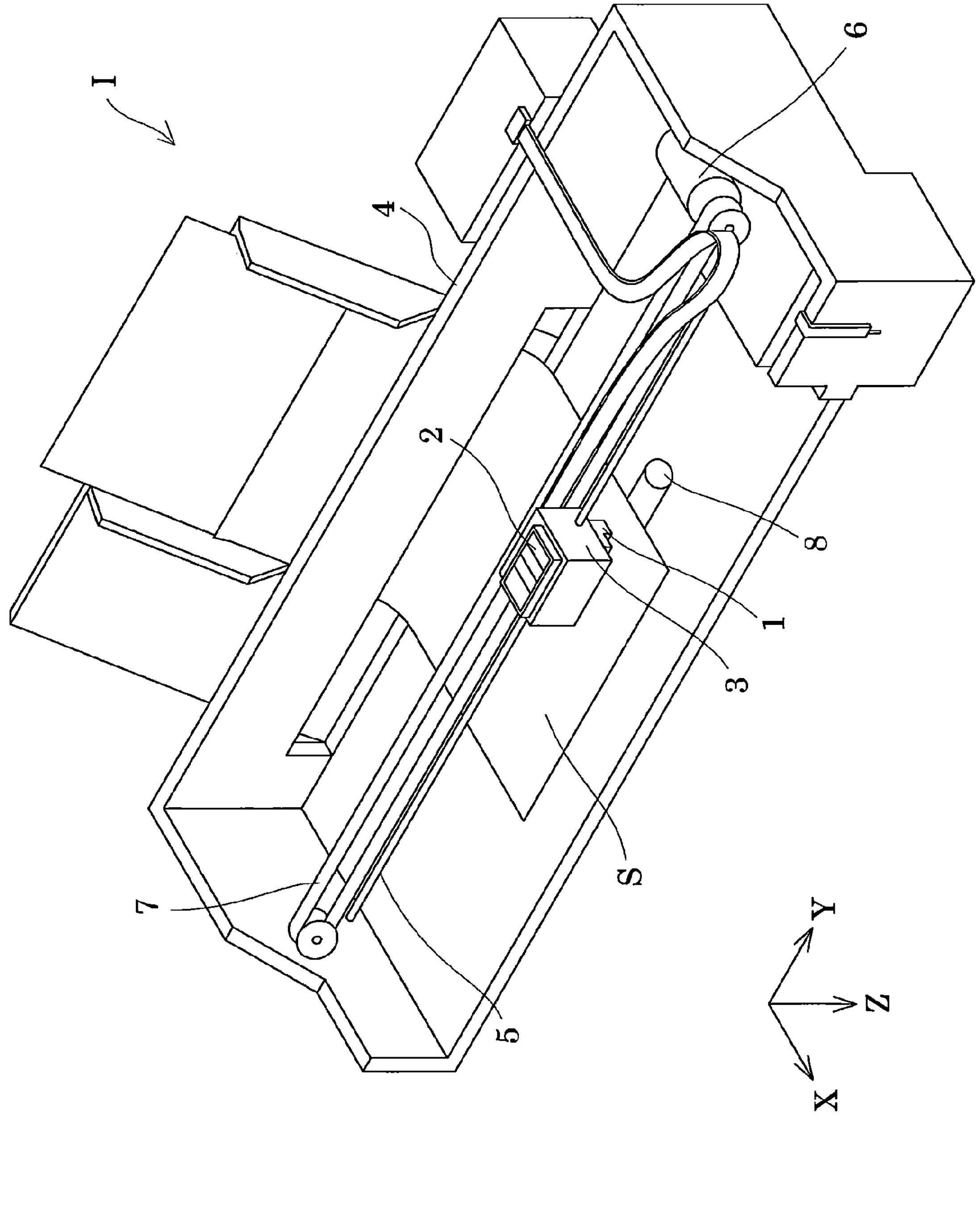
FIG. 10 is a schematic diagram illustrating a printing apparatus according to an embodiment.

The print heads 1 of Embodiment 1 is to be used in an ink-jet printing apparatus I. FIG. 10 is a schematic diagram illustrating an example of an ink-jet printing apparatus I.

In the ink-jet printing apparatus I illustrated in FIG. 10, a print head 1 is provided with a cartridge 2 serving as a liquid supply unit such that the cartridge 2 is detachable from the print head 1. A carriage 3 on which this print head 1 is mounted is provided on a carriage shaft 5 attached to an apparatus body 4 such that the carriage 3 is movable in the direction of the carriage shaft 5.

When the driving force of the drive motor 6 is transmitted to the carriage 3 via a plurality of gears (not illustrated) and a timing belt 7, the carriage 3 having the print head 1 mounted on it moves along the carriage shaft 5. The apparatus body 4 is provided with a transportation roller 8 serving as a transportation unit, and the transportation roller 8 transports a print sheet S which is a print medium such as paper. Note that the transportation unit that transports the print sheet S is not limited to a transportation roller and maybe a belt, a drum, or the like.

Further, although the foregoing ink-jet printing apparatus I is an example in which the print head 1 is mounted on the carriage 3 and moves in the main scanning direction, the disclosure is not particularly limited to this configuration. For example, the present disclosure can be applied to a so-called line printing apparatus in which the print head 1 is stationary, and printing is performed only by moving a print sheet S such as paper in the sub-scanning direction.

Although the foregoing embodiments describe an ink-jet print head as an example of a liquid ejecting head and an ink-jet printing apparatus as an example of a liquid ejecting apparatus, the present disclosure is aimed at a wide range of general liquid ejecting heads and liquid ejecting apparatuses. Hence, as a matter of course, the present disclosure can be applied to liquid ejecting heads and liquid ejecting apparatuses that eject liquid other than ink. Examples of other liquid ejecting heads include various print heads used in image printing apparatuses such as printers, coloring-material ejecting heads used in the production of color filters for liquid crystal displays or the like, electrode-material ejecting heads used to form electrodes in organic EL displays, field-emission displays (FEDs), and the like, bioorganic-substance ejecting heads used for bio-chip fabrication, and the like. The present disclosure can also be applied to liquid ejecting apparatuses including such liquid ejecting heads.

The present disclosure may be applied to not only liquid ejecting heads typified by ink-jet print heads but also piezoelectric devices included in ultrasonic devices, motors, pressure sensors, pyroelectric elements, ferroelectric elements, and the like. In addition, finished products including these piezoelectric devices are also included in examples of piezoelectric devices, for example, liquid-or-the-like ejecting apparatuses including the above liquid-or-the-like ejecting heads, ultrasonic sensors including the above ultrasonic devices, robots including the above motors as drive sources, IR sensors including the above pyroelectric elements, and ferroelectric memory including ferroelectric elements.

What is claimed is:

1. A piezoelectric device comprising:

a substrate having a plurality of recesses;

a vibration plate provided on one side of the substrate; and a piezoelectric actuator including layers of first electrodes, a piezoelectric layer, and a second electrode provided in this order on the vibration plate side, wherein the piezoelectric actuator has a plurality of active portions including the first electrode, the second electrode, and the piezoelectric layer held between the first electrode and the second electrode, the first electrode serves as an individual electrode individually provided for each active portion, the second electrode serves as a common electrode shared by the plurality of active portions, and the second electrode includes a first end portion serving as a reference and a protruding portion protruding from an end portion of the active portion beyond the first end portion toward a coupling electrode electrically coupled to the first electrode.

2. The piezoelectric device according to claim 1, wherein a width of the protruding portion in a direction orthogonal to a protruding direction gradually decreases toward the coupling electrode.

3. The piezoelectric device according to claim 1, wherein a distal end portion of the protruding portion has a parallel portion parallel to the coupling electrode.

4. The piezoelectric device according to claim 3, wherein a width of the parallel portion in a direction orthogonal to a protruding direction of the protruding portion is larger than or equal to a width of the coupling electrode.

5. The piezoelectric device according to claim 1, wherein a base of the protruding portion overlaps the first electrode as viewed in a stacking direction of the piezoelectric actuator and the substrate.

6. The piezoelectric device according to claim 1, wherein a width of the protruding portion in a direction orthogonal to a protruding direction of the protruding portion is largest at a distal end of the protruding portion.

7. A liquid ejecting head comprising:

a substrate having a plurality of pressure chambers connected to nozzles configured to eject liquid;

a vibration plate provided on one side of the substrate; and a piezoelectric actuator including layers of first electrodes, a piezoelectric layer, and a second electrode provided in this order on the vibration plate side, wherein the piezoelectric actuator has a plurality of active portions including the first electrode, the second electrode, and the piezoelectric layer held between the first electrode and the second electrode, the first electrode serves as an individual electrode individually provided for each active portion, the second electrode serves as a common electrode shared by the plurality of active portions, and the second electrode includes a first end portion serving as a reference and a protruding portion protruding from an end portion of the active portion beyond the first end portion toward a coupling electrode electrically coupled to the first electrode.

8. A liquid ejecting apparatus comprising the liquid ejecting head according to claim 7.

* * * * *